(12) United States Patent
Zini et al.

(10) Patent No.: US 6,307,149 B1
(45) Date of Patent: Oct. 23, 2001

(54) NON-CONTAMINATING LIGHTNING PROTECTION SYSTEM

(75) Inventors: Richard Ralph Zini, Kennesaw; William Carles Houston, Dallas; William Ferrel Bentley, Jr., Mableton, all of GA (US)

(73) Assignee: FCC/Enforcement Bureau, Powder Springs, GA (US)

( * ) Notice: Subject to any disclaimer, the term of this patent is extended or adjusted under 35 U.S.C. 154(b) by 0 days.

(21) Appl. No.: 09/393,489

(22) Filed: Sep. 10, 1999

(51) Int. Cl.[7] .................................................. H02G 13/00
(52) U.S. Cl. ............................... 174/3; 174/4 R; 361/221
(58) Field of Search ......................... 174/2, 3, 4 R; 361/117, 215, 220, 221, 222

(56) References Cited

U.S. PATENT DOCUMENTS

| | | |
|---|---|---|
| 4,605,814 | 8/1986 | Gillem . |
| 4,910,636 | 3/1990 | Sadler et al. . |
| 5,043,527 * | 8/1991 | Carpenter, Jr. .......................... 174/2 |
| 5,073,678 | 12/1991 | Carpenter, Jr. . |
| 5,898,402 | 4/1999 | Kilpatrick . |

OTHER PUBLICATIONS

NFPA 780, Standard for Installation of Lightning Protection Systems, 1997 Edition (no month).

* cited by examiner

*Primary Examiner*—Jessica Han
(74) *Attorney, Agent, or Firm*—W. Ferrel Bentley, Jr.

(57) ABSTRACT

This invention is directed towards a lightning prevention system that prevents lightning strikes by draining the ambient static charge before the electrical potential reaches the electrical breakdown point of the atmosphere. This invention suppresses the radiation of a secondary incoming radio wave (IRW) by reducing the electromagnetic interaction of an incoming IRW with components of this invention. To this end, this invention consists of a static charge dissipater and a grounding line. The static charge dissipater is a conductive tube that contains a large number of small diameter conductive wires that are partially inside the conductive tube. The single grounding line consists of an application appropriate length of small gauge wire. To prevent the radiation of a secondary IRW, ferrite beads are spaced equally along the grounding line at an application appropriate distance. The ferrite bead acts to break the effective electromagnetic length of the grounding wire into smaller segments such that the incoming IRW cannot resonate within the grounding line and thus cannot create a secondary IRW. The number of static dissipaters and grounding lines depends upon the individual structure or system being protected.

17 Claims, 4 Drawing Sheets

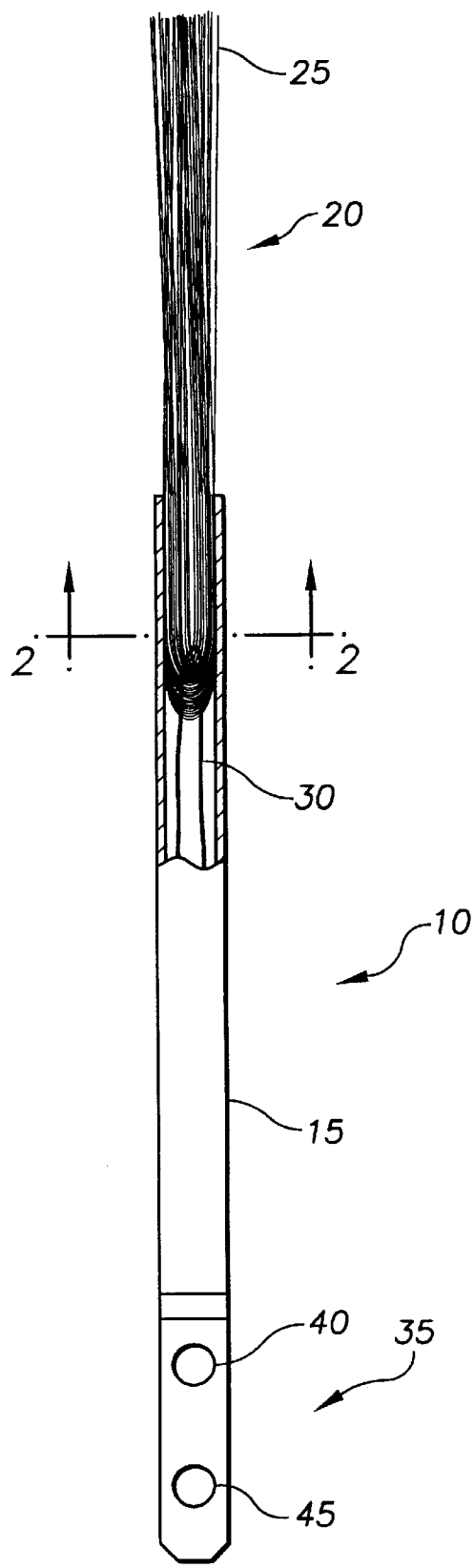
FIG. 1
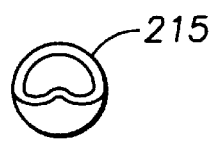
FIG. 2
FIG. 3
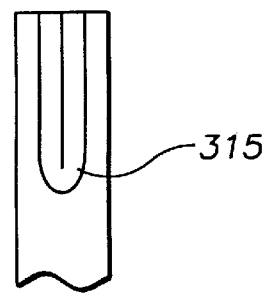
FIG. 4
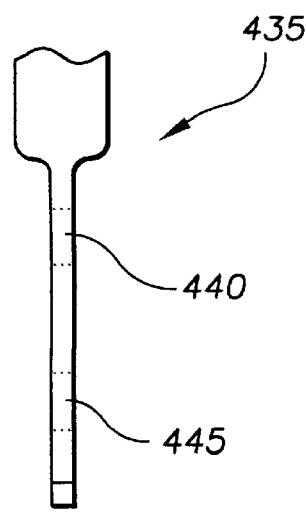

NON-CONTAMINATING LIGHTNING PROTECTION SYSTEM

The invention described herein was made by employees of the United States Government and may be manufactured and used by and for the Government for governmental purposes without payment of any royalties thereon or therefor.

1. Field of Invention

This invention relates to the prevention of lightning strikes by draining ambient static charge from the atmosphere through a static charge dissipation system while suppressing shifted radio waves due to the electromagnetic interaction of the lightning protection system and any incoming radio waves.

2. Background of the Invention

Lightning is the result from the electrical interaction between the clouds and between the clouds and the earth ground. This electrical interaction results from the friction caused by the air currents within the clouds. As the charged cloud passes through the atmosphere, there is a corresponding footprint of oppositely charged particles following the cloud on the earth ground. When the resulting electric potential exceeds the electrical breakdown potential, a lightning strike occurs.

Traditionally, there have been two types of lightning protection systems that attempt to control the effects of a lightning strike. First was developed the traditional lightning rod system that consisted of straight metal rods attached to the highest point of a structure. The rod was then connected to a large wiring system that directed the lightning strike to the earth ground. The second major system to be developed was the static dissipation system which consists of a series of fine wires which drain the ambient static charge from the atmosphere to prevent the occurrence of a lightning strike.

The first lighting protection system was the traditional lightning rod, which is a straight metal rod that is mounted on the tallest point of a structure. Multiple rods are placed on the structure and then electrically connected to the earth ground by large copper cabling. This cabling is on the order of a #0 wire to a ½" copper bus line. This cabling is requires a large amount of copper which is quite expensive and difficult to acquire.

Unfortunately, traditional lightning rod systems have only one point of dissipation per rod. Each rod then directs all of the lightning discharge through the copper cabling to the earth ground. This produces extremely high currents over a short time periods and requires extremely low electrical impedance of the rods and the cabling, the electrical connections between the rods and cabling, and between the system and the earth ground. The large cabling and the low electrical impedance dissipate the very high amplitude currents that the system is exposed to during the lightning strike which can easily destroy the system if not be adequately discharged into the earth ground.

This lightning rod system also does not prevent the lightning strike but directs the strike to a more desirable location (i.e. earth ground). It conducts the electrons from the lightning bolt itself via a sharp point on the end of the rod; however, the point quickly dulls due to corrosion, which decreases its effectiveness.

In addition, lightning rod systems cannot prevent radio frequency fields from emanating from the rods or the cabling. It has been shown that a lightning strike actually consists of a series of discharges that produce rapidly expanding and contracting electromagnetic fields. These fields induce electrical currents in nearby wires and electrical equipment. While vacuum tube equipment was relatively unaffected by such induced currents, solid state electronic devices can be easily damaged even when not in use or connected to a power source.

The second traditional system is a static dissipation system. Such systems use many small metallic points connected to a central point to create a passively ionized field to continually discharge the ambient static electric field. Each of the metallic points discharges a small amount of potential difference between the cloud and the earth ground creating a continuous low level current flow. This constant drainage prevents the ambient static charge around the static dissipater from reaching the electrical breakdown potential that could result in a lightning strike.

One such example is set forth in U.S. Pat. No. 4,605,814, entitled "Lightning Deterrent" issued to Gillem on Aug. 12, 1986, which discloses a cable having a multiplicity of fine conductive wires captured within the strands of a cable, emanating therefrom in a brush-like manner. In use, the cable is formed to mimic the outside shape of the structure to be protected to dissipate the ambient static charge to minimize the possibility of a lightning strike.

Unfortunately, it may not be practical to surround the outside shape of a larger structure with a single cable of this nature. In addition, there are no provisions made to prevent electromagnetic interference damaging nearby electronic devices.

Another example of a static dissipation system is U.S. Pat. No. 4,910,636, "Static Electricity Dissipater", to Sadler et al, issued Mar. 20, 1990, which sets forth a static dissipation system in which a series of fine wires emanate from a conductive center rod into a mushroom-like form. The conductive wires emanating from the conductive base dissipates the ambient static charge. With proper installation, this minimizes the electric potential differential between a protected structure and the atmosphere and therefore reduces the likelihood of a lightning strike to the structure.

Unfortunately, this system requires the fine wires to be extensively heat treated and wound such that the wires are unconditionally straight for optimal performance. Further, this system commonly replaces the lighting rod of a traditional lightning protection system and requires a very low contact resistance. This limits the choice of what materials can be use to construct the system. The combined system also requires very large cabling connecting it to earth ground and low contact resistance between interconnecting parts and between the cabling and the earth ground.

Another example of a static dissipation system is set forth in U.S. Pat. No. 5,073,678, entitled "Spline Ball Terminal (SBT)", issued to Sadler et al on Dec. 17, 1991. This patent sets forth a spline ball terminal dissipation array that requires a specific number of elements, having a specific length and a specific orientation to each other. This system also is attached to a traditional lightning protection system with large cabling and low impedance requirements.

In addition to reducing the complexity of the grounding system required for the operation of the lightning protection system, there is also a need for lightning protection systems which does not contaminate the surrounding radio frequency fields.

One such system that needs lightning protection as well as non-contaminated radio frequency fields is the land based radio frequency automatic direction finding system (ADF) as set forth in Commonly Assigned U.S. Pat. No. 5,898,402, entitled "A Wide Aperture Radio Frequency Data Acquisition System" issued to Kilpatrick on Apr. 27, 1999, hereby incorporated in its entirety by reference. The ADF system uses a number of antennas laid out in a specific pattern on a moderately level earth ground surface. To determine the angle of arrival of a particular signal, the system depends upon the precise measurement of the instantaneous amplitude and phase of the incoming radio wave (IRW) at a minimum of three of the receiving antennas in the ADF antenna array. The measurements are then correlated to determine the angle of arrival of the IRW.

If the incoming IRW is contaminated by any additional IRW, then it may be impossible to determine the angle of arrival of the incoming IRW. Additional IRW can be generated by the interaction between the incoming IRW and other metallic structures such as the cabling and dissipation structures such as lightning rods or static dissipaters of prior art system as set forth above. The metallic portions will transmit an additional IRW with a random phase and possibly almost equal amplitude. When the multiple IRW reach the ADF receiving antennas, the primary IRW can no longer be identified or measured.

Accordingly, it would be desirable to develop a lightning protection system that prevents lightning strikes, that uses readily available materials, that does not require very low contact impedance levels, and prevents the radiation of a secondary incoming radio wave due to the interaction of an incoming radio wave with the elements of the lightning protection system.

SUMMARY

This invention is directed towards a lightning prevention system that prevents lightning strikes by draining the ambient static charge before the electrical potential reaches the electrical breakdown point of the atmosphere. This invention also suppresses the radiation of a secondary IRW by reducing the electromagnetic interaction of an incoming IRW with components of this invention.

To this end, this invention consists of a static charge dissipater and a grounding line. The static charge dissipater is a conductive tube that contains a large number of small diameter conductive wires that are partially inside the conductive tube. The single grounding line consists of an application appropriate length of small gauge wire. To prevent the radiation of a secondary IRW, ferrite beads are spaced equally along the grounding line at an application appropriate distance. The ferrite bead acts to break the effective electromagnetic length of the grounding wire into smaller segments such that the incoming IRW cannot resonate within the grounding line and thus cannot create a secondary IRW. The number of static dissipaters and grounding lines depends upon the individual structure or system being protected.

DESCRIPTION OF DRAWINGS

The above and other aspects, features, and advantages of the present invention will be more apparent from the following more particular description thereof, presented in conjunction with the following drawings wherein:

FIG. 1 sets forth an uninstalled embodiment of the static dissipation unit according to the present invention;

FIG. 2 sets forth a cross section of a crimped base member according to the present invention;

FIG. 3 sets forth a vertical view of a crimped base member according to the present invention;

FIG. 4 sets forth an embodiment of the mounting tab of the base member according to the present invention;

DETAILED DESCRIPTION OF THE PREFERRED EMBODIMENTS

Figure 5:
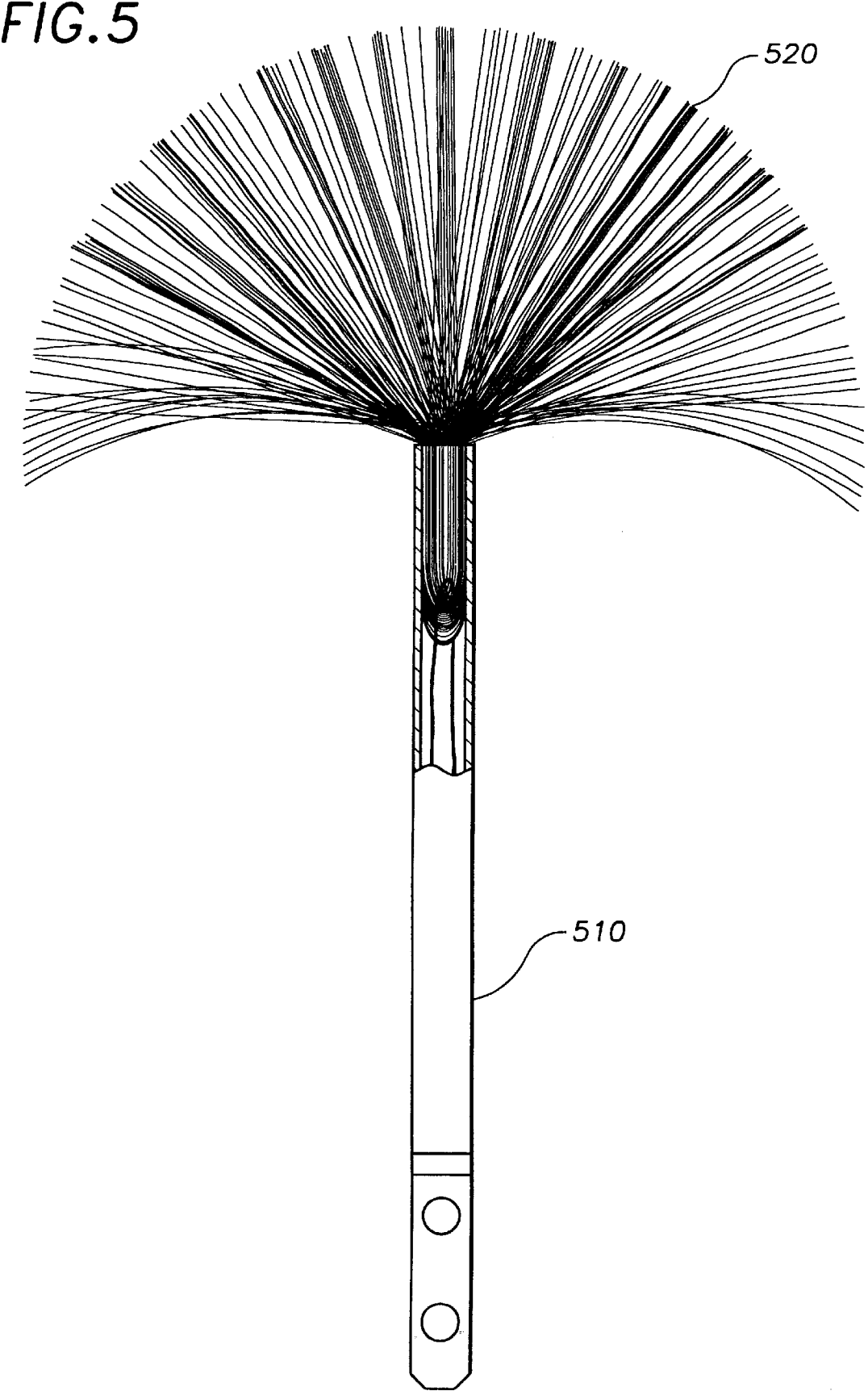
FIG. 5 sets forth an installed embodiment of the static dissipation unit according to the present invention.

Referring now to FIG. 1, the static dissipater of this invention is set forth as a single unit. While the preferred embodiment is shown to combine this dissipation unit with an elevated tower to protect an ADF system, one of ordinary skill in the art could apply the principles of this invention to other systems to provide lightning prevention.

FIG. 1 sets forth the static dissipater unit 10. The static dissipater unit 10 comprises an electrically conductive base 15 with a multitude of fine wires 20 emanating from the upper end of the base member 15. The fine wires 20 comprise a stainless steel dental type wire 25 of approximately 0.001"–0.01" that are not pretreated before inclusion in the static dissipater unit 10. The material choice depends upon the needed strength and corrosion resistance.

Each individual wire 25 acts as a single point of discharge. As the diameter of the wire 25 increases, the effectiveness of each individual wire 25 begins to decrease. As the diameter of the wire 25 decreases, the wires 25 become unable to support themselves to achieve the correct spherical-like shape. The length of the wire 25 depends upon the thickness and the material chosen. In this application, the wires 25 are cut to a length of approximately 8" which gives an effective length of approximately 3 ½" after insertion into the base member.

The length of the base member 15 is entirely subjective for each individual application and to the material on hand. In general, the base members 15 can be between 5" and 10" long and almost any given diameter. As the diameter increases, the number of individual wires 25 increases. The conductive base member 15 is generally constructed of stainless steel due to its material strength and its resistance to corrosion. Any conductive metal can be used; however, copper has the drawback of being extremely soft, annealed brass can be extremely difficult to procure, and most other materials have similar drawbacks.

The static dissipater units 10 are designed with ease of construction and low cost as the primary objectives. As such, the wires 25 are cut using a simple wire pulling and cutting machine. The machine is set to cut an appropriate length (in this case, 8"), and the machine is allowed to operate until the desired number of lengths is cut (in this case, approximately 500 lengths to yield 1000 discharge points). The number of lengths increases or decreases as the diameter of the base member 15 increases or decreases. In this particular case, the number of lengths corresponds to the number of wires that are appropriate for the 5/16" diameter tubing used for the base member 15. The wires 20 are grouped together with the ends approximately even and tied near the middle of the bundle with a cord 30. The cord 30 is then fed through the base member 15, pulling the wire bundle 20 into the base member 15 as shown in FIG. 1. The upper end of the base member 15 is crimped to firmly capture the wires both physically and electrically as set forth in FIGS. 2 and 3.

FIG. 2 sets forth a cross sectional view along line AA of the crimped area of base member 215.

FIG. 3 sets forth a vertical view of the crimped edge of the base member 315.

The bottom end 435 of the base member 15 of FIG. 1 is flattened and drilled to create the mounting tab 35 and mounting holes 40,45. A side view of the mounting tab is set forth in FIG. 4. In addition, the through holes 440 and 445 are shown where the static dissipation unit is physically and electrically connected to another element.

Finally, the wires 520 of the static dissipater unit 510 are bent to form a uniform spherical shape as set forth in FIG. 5.

Many other well-known methods of manufacturing the dissipater can be used. It should be noted that the ease of construction and low cost enable multiple copies of the dissipater to be installed to improve the coverage area.

Figure 6:
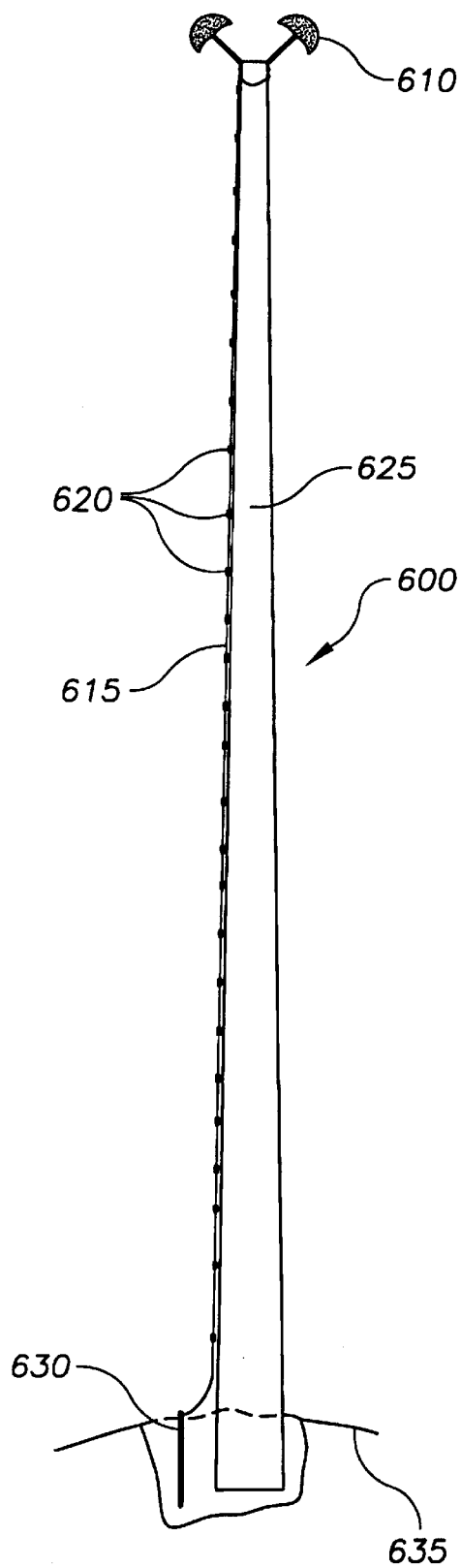
FIG. 6 sets forth an embodiment of the lightning protection unit according to the present invention.

FIG. 6 sets forth a non-contaminating lightning protection system using the static dissipater units 610 as set forth above. A lightning protection unit 600 comprises at least one dissipation unit 610 (shown as two dissipation units in this embodiment), a grounding line 615, a series of ferrite beads 620, a mounting structure such as a tower 625, and a grounding rod 630. The grounding line 615 comprises typically a #10 wire and appropriate ferrite beads 620 strung onto the grounding line 615. This grounding line 615 is securely attached to the tower 625 via any appropriate method such as staples, nails, etc. (not shown). The grounding line 615 is then electrically and physically attached to the static dissipater unit 610 and the grounding rod 630. The grounding rod 630 is a copper rod that is driven into the earth ground 635 for conduction of the ambient static charge to earth ground 635.

It should be noted that the grounding wire 615 used with this invention is considerably smaller in diameter than that of the prior art. Prior art systems were designed to handle the high current load of an actual lightning strike such as a traditional lightning rod system or were designed to be retrofitted into a traditional lightning rod system such as a static charge dissipation system. This invention prevents the lightning strike by conducting the ambient static charge and is only carrying currents on the milliampere level to earth ground. As such, this system requires a much smaller grounding line and can tolerate higher contact impedances between system members.

The tower 625 comprises an appropriately tall insulated structure made of, typically, either wood or fiberglass. The material and construction of the tower 625 can vary depending upon the individual application.

Ferrite beads 620 are placed on the grounding line 615 at intervals that depend upon the individual application. In general, the separation should be less than ⅛ of the wavelength of the highest frequency of concern. In this embodiment, the ADF system to be protected has a maximum frequency response of 30 MHz, and the ferrite beads 620 are spaced at 3 feet, which is approximately ¹⁄₁₀ of the wavelength of concern. The ferrite beads 620 should also be sized with an interior diameter that snugly fits on the grounding wire 615 for the best electromagnetic coupling. Tests show that performance is maximized when the grounding wire 615 is not covered with insulation, and there is no gap between the ferrite bead 620 and the actual copper of the grounding wire 615.

The choice of individual ferrite beads 620 depends upon individual applications. The permeability of the ferrite beads 620, which varies with frequency, should be maximized so as to minimize the physical size of the ferrite bead 620. On the other hand, the frequency response of the ferrite bead 620 is limited by its physical size. Therefore, the physical size and material of the ferrite bead 620 must be adjusted to achieve acceptable permeability well above the frequency of interest. In this particular case, the ADF system requires a permeability that is consistent well above the 30 MHz range for proper operation. The ferrite beads 620 are attached to the grounding line 615 through any of the conventional methods such as crimps in the grounding line, cable ties, adhesive, etc. (not shown).

Figure 7:
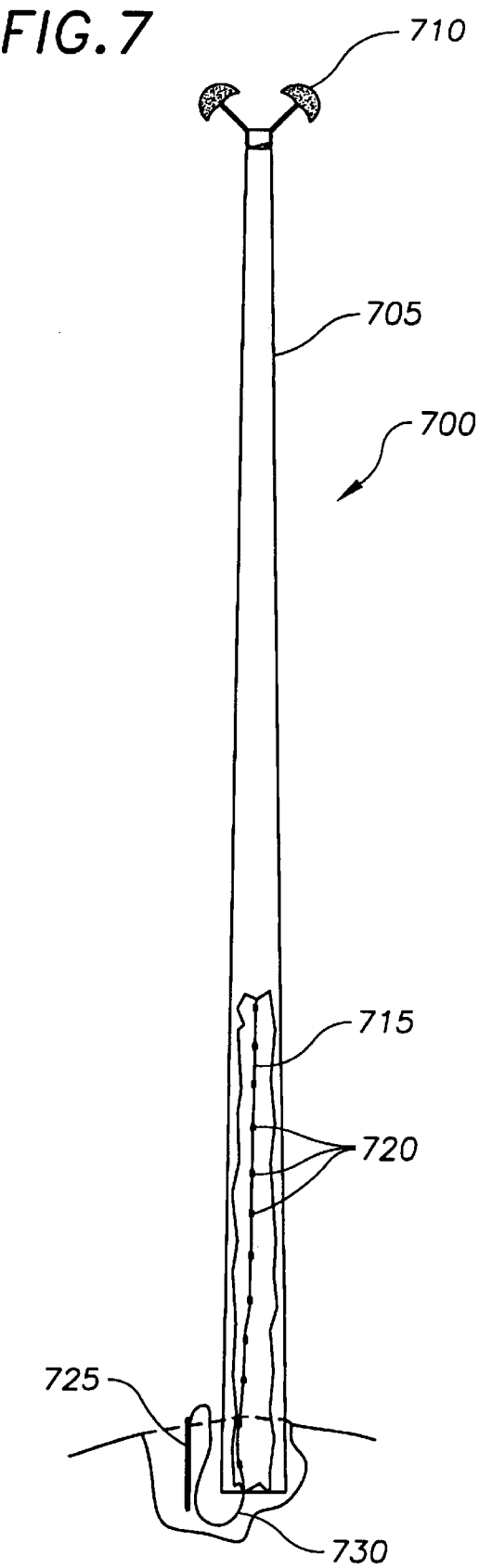
FIG. 7 sets forth an alternate embodiment of the lightning protection unit according to the present invention.

FIG. 7 sets forth an alternative lighting protection unit 700 in which the tower 705 is constructed of a hollow fiberglass pole with at least one static dissipation unit 7 710 the top. In this case, the grounding line 715, strung with ferrite beads 720, is mounted inside the tower 705 rather than attached to the outside of the tower 705 as set forth in FIG. 6. At the bottom of the tower 705, the grounding line 715 is routed back up to the earth surface and attached to the grounding rod 725. It should noted that a traditional lightning protection system could not accommodate the use of a hollow fiberglass pole in this manner since the large currents of a lightning strike will not follow the u-shaped turn 730 of the grounding line 715.

Figure 8:
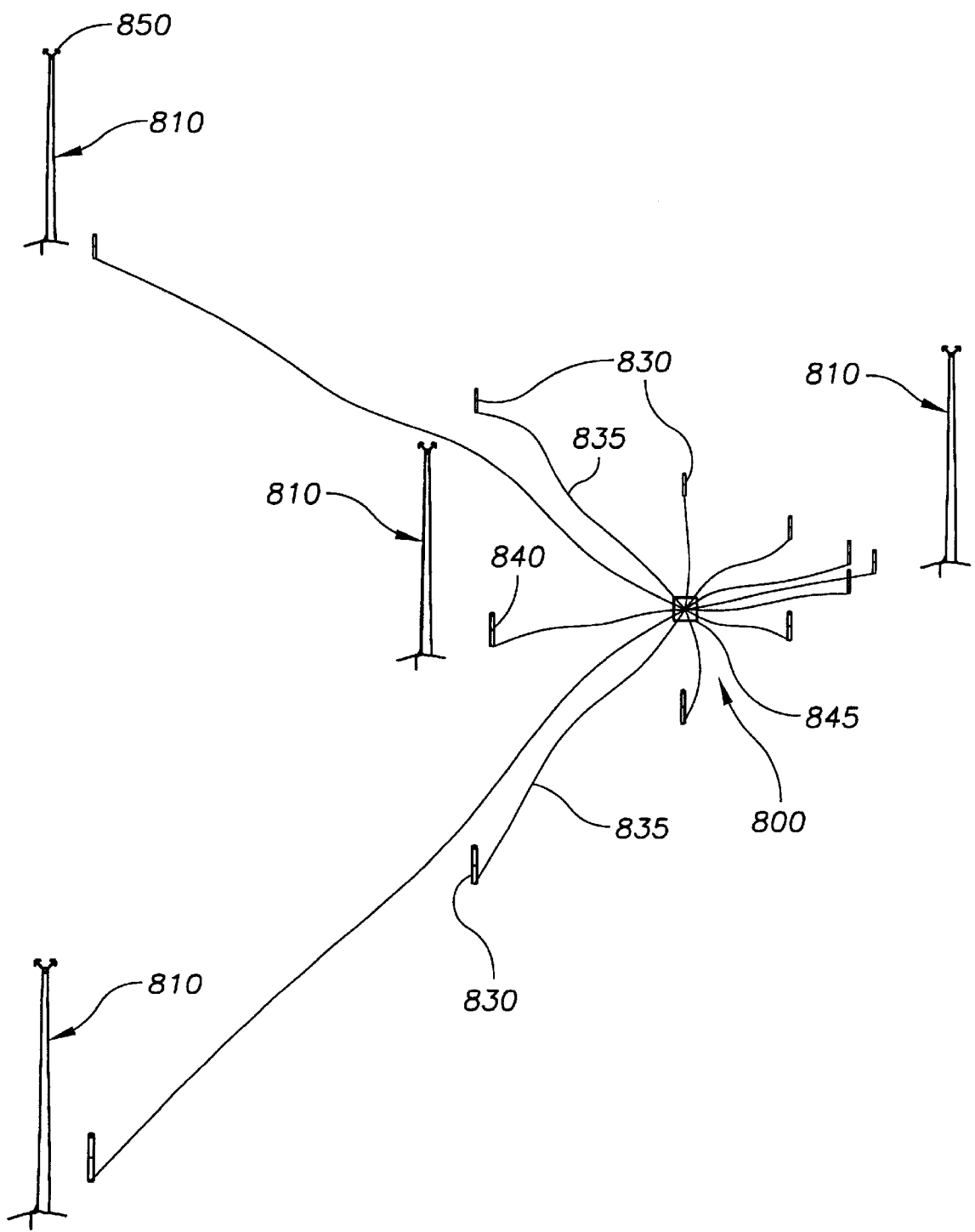
FIG. 8 sets forth a combination of an automatic direction system and a lightning protection system according to the present.

FIG. 8 sets forth the preferred embodiment of the invention in combination with the ADF system 800 as set forth above. FIG. 8 sets forth the placement of the lightning protection units 810 of this invention in conjunction with the physical layout of the antennas 830 and interconnections 835 of the ADF system on the earth ground surface.

The ADF system 800 consists of several receiving antennas 830, a monitoring antenna 840, and a receiver house 845. These elements are interconnected via underground cabling 835. In the receiving house 845, each of the antennas 830 are connected to matched receivers (not shown) to determine the incoming radio signal of interest as well as the angle of arrival of the incoming radio signal of interest. The telecommunications cabling and electrical power cabling (not shown) come from off-site and lead into the receiver house 845. The details of operation of this particular ADF system can be found in Commonly-Assigned U.S. Pat. No. 5,898,402, entitled "A Wide Aperture Radio Frequency Data Acquisition System" issued to Kilpatrick on Apr. 27, 1999.

In this particular application, the invention comprises eight individual static dissipater units 850 atop four towers 810 with grounding lines and ferrite beads as set forth in FIG. 6 or 7. The towers 810 are distributed around the ADF antenna array 830 to provide protection to all of the antennas 830 while minimizing the number of towers needed, typically as shown in FIG. 8. Optionally, additional static dissipater units 850 could be placed around the perimeter of the receiver house 845 to provide additional protection to the sensitive electronic equipment within the receiver house 845. This layout can be modified as is well known in the art to maximize the lightning protection for other sites or applications.

The spacing of the towers 810 is based upon each individual application and the tower height available. According to NFPA 780 and the 150 foot rolling sphere theory, a standard type air terminal strike termination device atop a forty foot tower will provide protective strike coverage over approximately an one hundred foot diameter circle on the earth (for very low height objects such as ADF antennas). Tests have shown that the lightning protection unit as set forth above yields a protected coverage area of several times the one hundred foot circle. In this embodiment, the towers are approximately forty feet tall and are placed approximately six hundred feet apart. Using a six hundred foot protective circle, all ADF antennas are protected adequately.

As set forth above, the ADF system 800 detects the amplitude and phase of incoming radio signals at each of the antennas and through complex mathematical calculations, determines the orientation of the incoming IRW. If the ferrite beads (see FIGS. 6, 7) were not included in the system, the currents flowing through the grounding lines (see FIGS. 6, 7) due to the almost constant ambient static charge drainage induce other electromagnetic fields on the grounding line. These fields would interact with the incoming IRW, and the grounding line (see FIGS. 6, 7) becomes an active antenna to retransmit a secondary IRW. The combination of the two incoming radio waves arriving at the ADF antennas 830 contaminate the amplitude and phase data and prevention the determination the angle of arrival of the original IRW. The ferrite beads (see FIGS. 6, 7) prevent the activation of the grounding lines (see FIGS. 6, 7) as active antennas, and thus the ADF system 800 is protected from both lightning strikes and electromagnetic contamination.

Although this invention has been described with reference to particular embodiments, it is understood that these embodiments are merely illustrative of the application of the principles of the invention. This method and similar mounting apparatus can be used to provide lightning protection to any device requiring freedom from electromagnetic contamination. Accordingly, the embodiments described in particular should be considered exemplary, not limiting, with respect to the claims.

We claim:

1. A static dissipater for dissipating ambient static charge from an atmosphere to prevent or reduce risk of a breakdown of atmospheric resistance, the static dissipater being adapted for attachment to another structure, comprising:

a base member, the base member comprising a tube, the tube having two ends, an upper end and a bottom end;

a plurality of static dissipation elements, electrically and physically connected to the upper end, the static dissipation element comprising a length of untreated wire, the untreated wire having a center point, and the plurality of static dissipation elements being bent into a uniform sphere upon installation; and wherein the bottom end comprises an attachment element for electrically and physically attaching the dissipater to the another structure.

2. The static dissipater of claim 1, wherein the tube comprises stainless steel.

3. The static dissipater of claim 2, wherein the untreated wire comprises stainless steel.

4. The static dissipater of claim 3, wherein the length of untreated wire is equal to approximately 8".

5. The static dissipater of claim 3, wherein the plurality of static dissipaters comprises approximately 1000 endpoints of untreated wire.

6. The static dissipater of claim 1, wherein the untreated wire comprises stainless steel.

7. The static dissipater of claim 1, wherein the length of untreated wire is equal to approximately 8".

8. The static dissipater of claim 1, wherein the plurality of static dissipaters comprises approximately 1000 endpoints of untreated wire.

9. The static dissipater of claim 1, wherein the plurality of untreated wires are bent at the center point and are pulled inside the upper end, and wherein the plurality of untreated wire being inside the upper end forms the physical and electrical connection.

10. A non-contaminating lightning protection system for reducing or eliminating risk of lightning to a protected device, comprising:

a static dissipater, the static dissipater comprising a tube with an upper end and a bottom end, a plurality of static dissipation elements electrically and physically connected to the upper end, the elements comprising a plurality of lengths of untreated wires, the untreated wires being shaped into a spherical form upon installation; and the bottom end comprising an attachment element;

a grounding line, electrically and physically connected to the attachment element, the grounding line comprising a length of small gauge conductive wire; and a plurality of ferrite beads, the beads being physically and electromagnetically attached to the grounding line, and a non conductive supporting structure, electrically insulated from but physically connected to the grounding line, for supporting the static dissipater in the atmosphere.

11. The lightning protection system of claim 10, wherein the grounding line comprises a #10 wire.

12. A lightning protection and radio frequency contamination elimination system for reducing or preventing lightning strikes by draining excess static charge and eliminating any resultant radio frequency contamination resulting from an interaction of incoming radio waves and the lightning protection and radio frequency contamination elimination system, the radio frequency system having a maximum radio frequency of interest, the maximum radio frequency of interest having a wavelength, the lightning protection and radio frequency contamination elimination system comprising:

a static dissipater, the static dissipater comprising a tube with an upper end and a bottom end, a plurality of static dissipation elements electrically and physically connected to the upper end, the elements comprising a plurality of lengths of untreated wires, the untreated wires being shaped into a spherical form upon installation; and the bottom end comprising an attachment element;

grounding line, electrically and physically connected to the attachment element, the grounding line comprising a length of small gauge uninsulated, conductive wire, the grounding line having an outer diameter and a length;

a plurality of ferrite beads, the beads being physically and electromagnetically attached to the grounding line, and a non conductive supporting structure, electrically insulated from but physically connected to the grounding line, for supporting the static dissipater in the atmosphere.

13. The system of claim 12, wherein the grounding line comprises a #10 wire.

14. The system of claim 13, further wherein the ferrite bead comprises an inner diameter, wherein the inner diameter approximately equals the outer diameter of the grounding line.

15. The system of claim 14, further wherein the plurality of ferrite beads are spaced along the length of grounding line, wherein the spacing is equal to or less than ⅛ of the wavelength of the maximum radio frequency of interest.

16. The system of claim 12, wherein the ferrite bead comprises a inner diameter; wherein the inner diameter approximately equals the outer diameter of the grounding line.

17. The system of claim 12, further wherein the plurality of ferrite beads are spaced along the length of grounding line, wherein the spacing is equal to or less than ⅛ of the wavelength of the maximum radio frequency of interest.

* * * * *